US006773262B1

(12) United States Patent
Blum

(10) Patent No.: US 6,773,262 B1
(45) Date of Patent: Aug. 10, 2004

(54) WORLD GLOBE WITH DETAIL DISPLAY

(76) Inventor: Alvin S. Blum, 2350 Del Mar Pl., Fort Lauderdale, FL (US) 33301

( * ) Notice: Subject to any disclaimer, the term of this patent is extended or adjusted under 35 U.S.C. 154(b) by 0 days.

(21) Appl. No.: 10/691,893

(22) Filed: Oct. 23, 2003

(51) Int. Cl.[7] .......................... G09B 27/08; G09B 29/004
(52) U.S. Cl. ....................... 434/146; 434/130; 434/131; 434/136; 434/142
(58) Field of Search ................................. 434/130, 131, 434/136, 145, 142

(56) References Cited

U.S. PATENT DOCUMENTS

| | | |
|---|---|---|
| 4,451,874 A | 5/1984 | Friedman |
| 4,790,756 A | 12/1988 | Caldwell |
| 5,057,024 A | 10/1991 | Sprott et al. |
| 5,519,809 A | 5/1996 | Husseiny et al. |
| 6,625,086 B1 | 9/2003 | Kim |

FOREIGN PATENT DOCUMENTS

JP        2002182555 A   *   6/2002    ........... G09B/27/08

* cited by examiner

*Primary Examiner*—Derris H. Banks
*Assistant Examiner*—Dmitry Suhol
(74) *Attorney, Agent, or Firm*—Alvin S. Blum

(57) ABSTRACT

A spherical world globe with geographic features imprinted on its surface rotates on an axis through the poles. The sphere is not large enough to carry legible details of all areas. Greater details are stored in a memory such as a compact disc. An indicator on the sphere slides north and south. A sensor senses the north south position of the indicator and sends a signal to a selection circuit connected to the memory. Another sensor connected to the rotation of the sphere sends an east/west signal to the memory. Using the two signals, the circuit find the area corresponding to the area selected on the sphere and displays it on a display in greater detail than is visible on the sphere.

3 Claims, 4 Drawing Sheets

WORLD GLOBE WITH DETAIL DISPLAY

This invention relates to geographic displays, and more particularly to a world globe with an accessory detailed display of a selected region of the globe.

BACKGROUND OF THE INVENTION

Spherical globes that have imprinted on their surface the map of the world are well known. They are generally provided with an axle through their north and south poles. They may be mounted on a base by the axle, so that they may be rotated for viewing a selected area. U.S. Pat. No. 6,625,086 issued Sep. 23, 2003 to Kim discloses a globe with a rotation sensor on the axle. A pointer indicates a longitude position at a particular time zone on the globe. The sensor feeds the rotation information into an electronic processor and a display indicates a major city in that time zone and also displays the current time in that time zone.

Navigational aids for providing maps in vehicles and on computers have detailed maps stored on a memory such as a computer disc. The information is retrieved by inputting some location data. This enables selection of particular map information from the memory to be displayed on a computer monitor or a small monitor, such as a battery operated liquid crystal display in a vehicle.

Globes can be imprinted with a great deal of geographic information. However, unless the world globe is very large, the details are not easily read. Because a globe is spherical, it is awkward and expensive to have a large one. It is much less awkward and costly to have detailed planar maps. They may also be more easily updated. Flat and folded maps are very useful, but they lack the perspective given by the globe.

SUMMARY OF THE INVENTION

It is accordingly an object of the invention to provide a world globe, with geographic features thereon, that rotates on an axle with the axle mounted on a base. The globe is not large enough to legibly carry all of the geographic and map information that the invention provides. Additional detailed information of a selected area of the globe is provided on a display attached to the globe either on the base or at another location. Detailed information, much more than can be imprinted even on a large globe, is stored on a memory such as, but not limited to, a compact disc. Input to the memory to select a detailed map of a particular area of the globe to be displayed on the display is provided by a longitudinal signal and a latitudinal signal. An arcuate meridian element running from the south pole to the north pole slidingly supports an indicator or reticle that may be moved north or south, and the globe rotated until the indicator or reticle is directly at the selected area. A rotary position sensor on the axle provides an east/west longitudinal signal, and a second sensor detecting the north-south location of the indicator or reticle on the meridian element provides the latitudinal signal. The two signals enable the system to select the appropriate map from the memory and to enable it to be displayed on the display. Another feature may enable the display of a more magnified map if desired.

These and other objects, features, and advantages of the invention will become more apparent when the detailed description is studied in conjunction with the drawings in which like elements are designated by like reference characters in the various drawing figures.

DETAILED DESCRIPTION OF PREFERRED EMBODIMENTS

Figure 1:
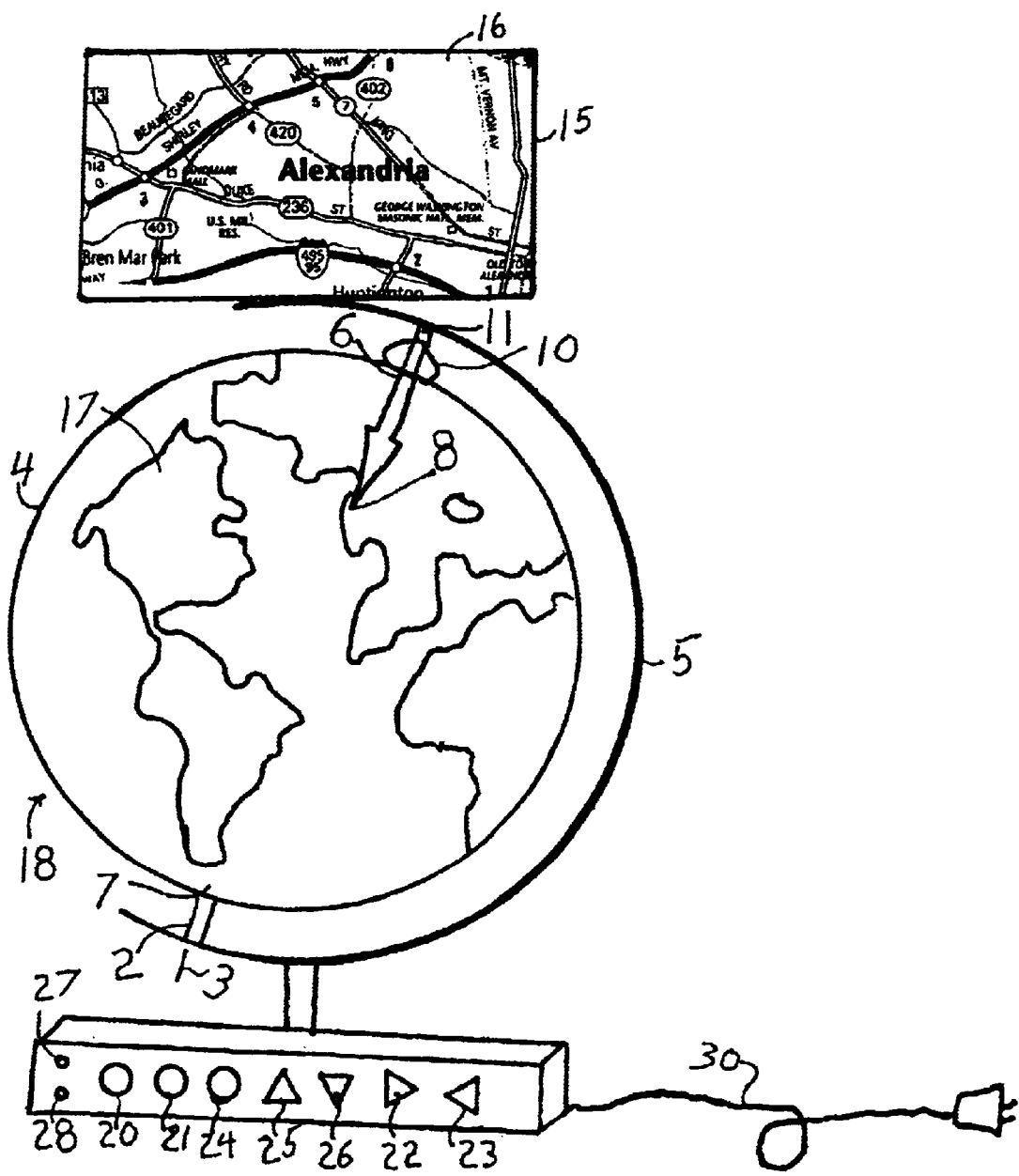
FIG. 1 is a front elevation view of the invention.
Figure 2:
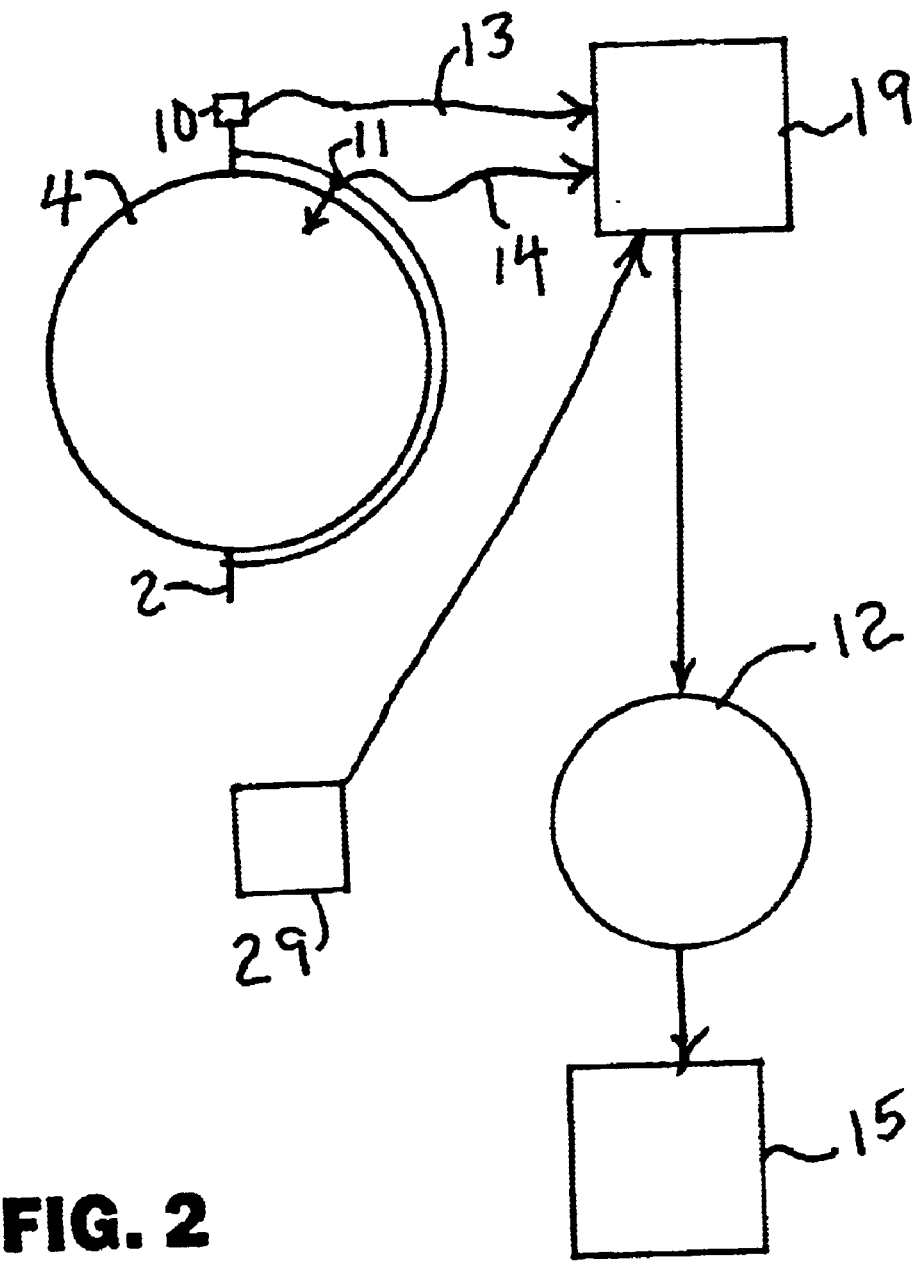
FIG. 2 is schematic representation of the invention.

Referring now to the drawing FIGS. 1–2, a globe 18 of the invention includes a sphere 4 imprinted with geographic indicia 17 on its surface. The sphere is supported on an axle 2 that is attached to support base 1. The sphere rotates about an axis 3 through the north pole 6 and the south pole 7. A meridian member 5 extends between the two poles. An indicator 8 such as an arrow pointer is slidably mounted on the meridian member for north/south motion of the tip of the indicator on the sphere. By rotation of the sphere in the east/west direction and motion of the indicator in the north/south direction, a particular area of the earth is located. A signal 13 from a first sensor 10 sensing rotation of the sphere and therefor longitudinal information, and a signal 14 from the second sensor 11 sensing sliding position of the indicator and therefor latitudinal information of the selected area are fed to circuit 19. Circuit 19 selects a particular portion of the memory 12 corresponding to the selected area. That detailed map information 16 is displayed on the display 15. The memory 12 may be any of the memory media well known in the art. It may be easily replaced with updated information, of with another language. Control buttons 20 and 21 select low and high magnification map displays. Button 22 moves the display to an area east, and button 23 moves the display to an area west. Button 25 moves to an area north, and button 26 moves to an area south. These functions are well known in the vehicle navigation and computer map display art. Button 24 displays the current time at the selected area. An internal clock 29 is set by positioning the indicator 8 at a location where the time is known, then entering the correct time using the hour button 27 and minute button 28. When moved to a different time zone, the system displays the time corrected to that time zone. Electric power is supplied through power cord 30.

Figure 3:
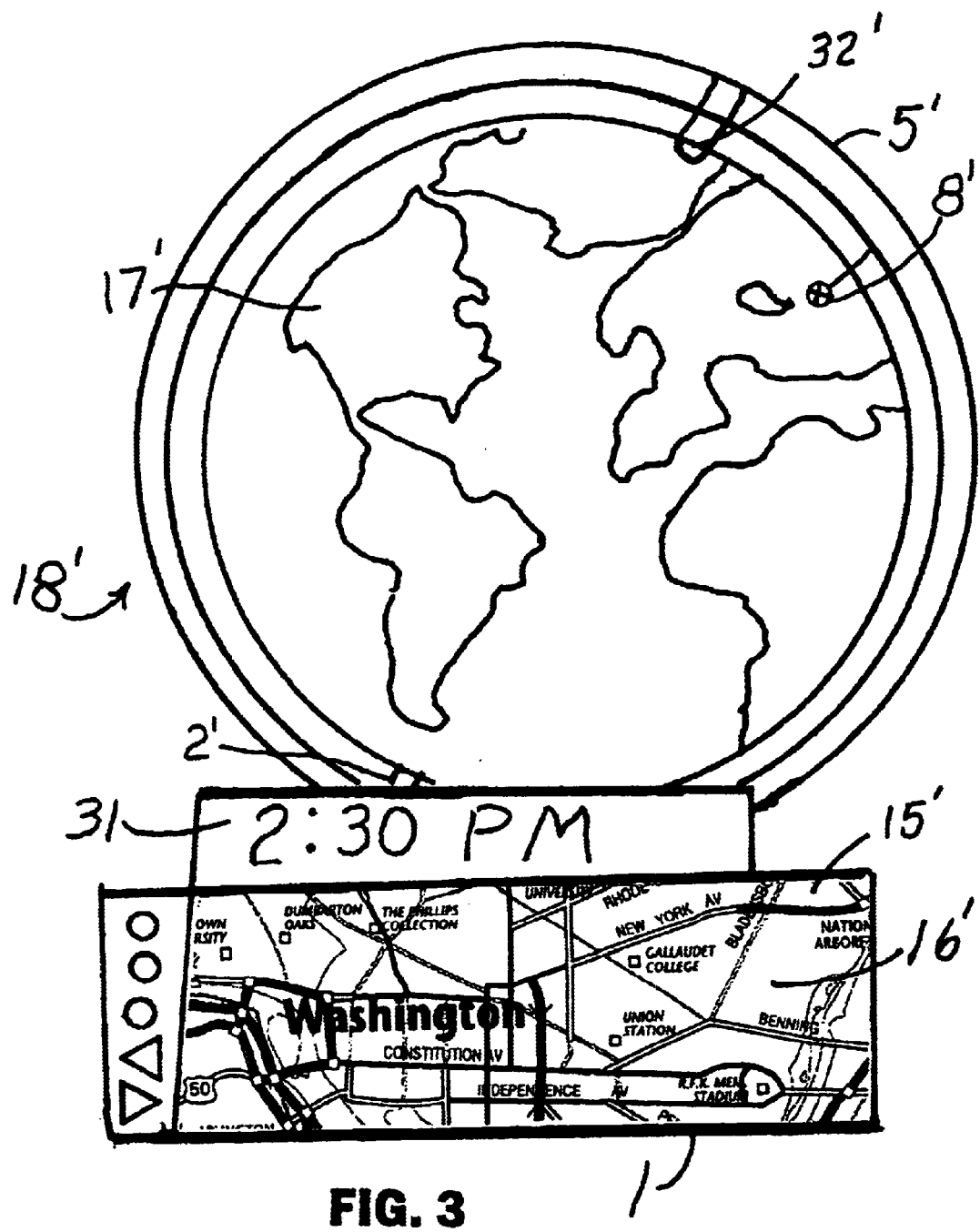
FIG. 3 is a front elevation view of another embodiment of the invention.
Figure 4:
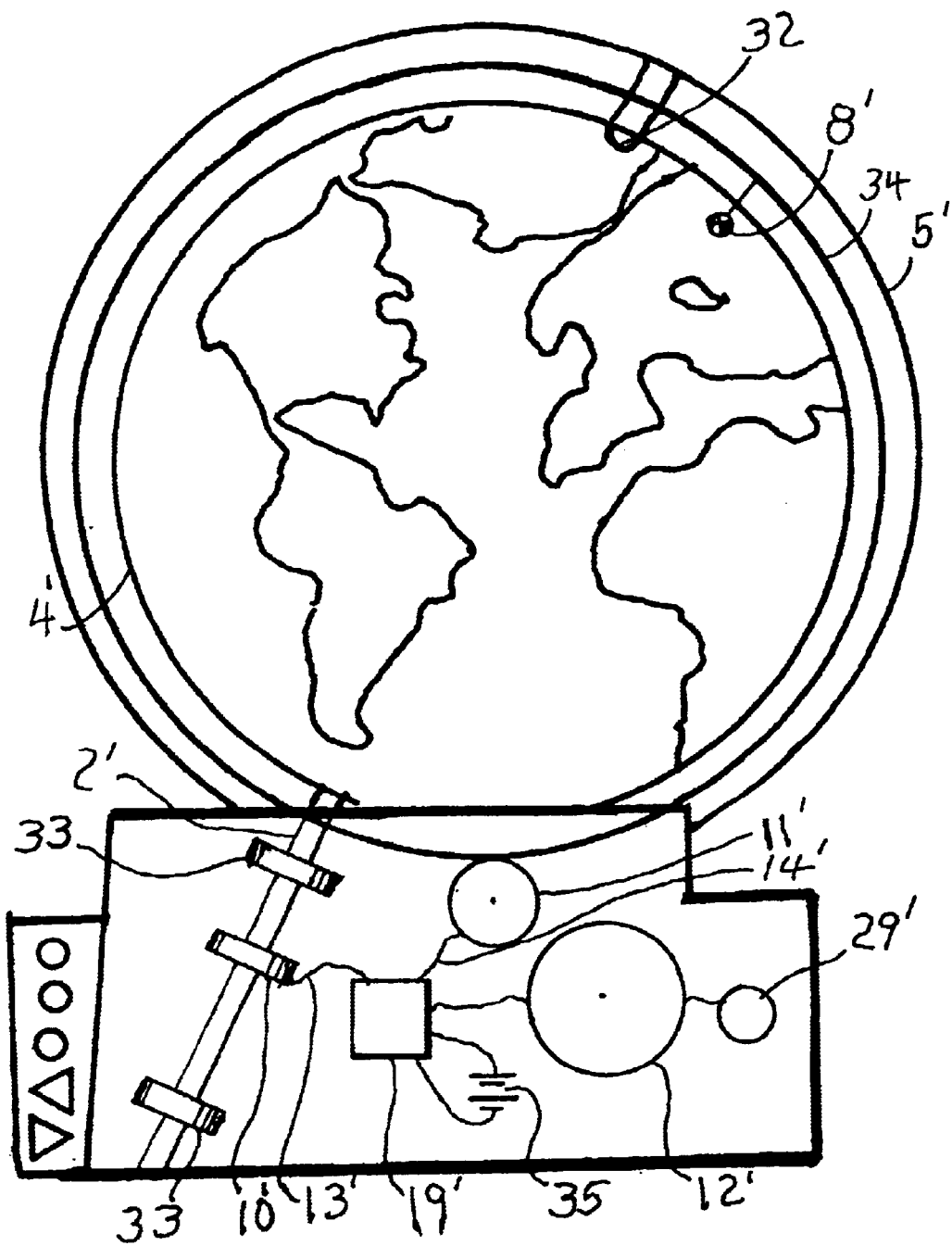
FIG. 4 is front elevation view of the embodiment of FIG. 3 with the display panel removed.

Referring now to FIGS. 3 and 4, another embodiment 18' of the invention is shown in which the display panel 15' is mounted on the base 1' to display a detailed map 16' and the time 31 at the location indicated by the cross hairs of the reticle 8'. The sphere 4' imprinted with geographic information 17' is mounted on an axle 2' at the south pole with a pivot 32 at the north pole. The sphere and axle rotate together. The axle is rotatably supported by the two bearings 33 within the base. A rotary position first sensor 10' sends a signal through wire 13' to the computer circuit 19' indicating the longitudinal position of the reticle. A meridian member 5' encircles the sphere and supports the pivot 32. The reticle is mounted on a circular element 34 that is concentric with meridian member 5' and that slides within a track on member 5'. A second sensor 11' engages the element 34 and rotates when reticle and element 34 move, sending a signal representative of the latitude of the reticle through wire 14' to the circuit 19'. The circuit 19' selects from the memory 12' a particular detailed map 16' of the selected area for display on the display 15'. A clock circuit 29' provides time for time display 31. Electric power is provided by battery 35.

While I have shown and described the preferred embodiments of my invention, it will be understood that the invention may be embodied otherwise than as herein specifically illustrated or described, and that-certain changes in form and arrangement of parts and the specific manner of practicing the invention may be made within the underlying idea or principles of the invention.

What is claimed is:

1. A globe assembly for displaying features of the world comprising:
   a) a base;
   b) an axle on the base;
   c) a sphere representative of the earth supported on the axle for rotation about an axis through the north and south poles;
   d) a meridian member extending between the poles;
   e) an indicator slidably mounted on the meridian member for movement in a north/south direction on the sphere;
   f) a first sensor mounted so as to provide a longitudinal signal representative of the rotary position of the sphere relative to the base;
   g) a second sensor mounted so as to provide a latitudinal signal representative of the position of the indicator on the meridian;
   h) a memory operatively connected to the signals from the first and second sensors, the memory storing more detailed map information than is imprinted on the sphere; and
   i) a display for displaying detailed map information selected from the memory representing the area indicated by the indicator.

2. The globe assembly according to claim 1 further comprising an internal clock and means for displaying time at the selected area.

3. A method of simultaneously displaying a spherical geographic representation of the world along with a more detailed display of an area selected from the spherical geographic representation, the method comprising:
   a) providing:
      i) a base;
      ii) an axle on the base;
      iii) a sphere representative of the earth supported on the axle for rotation about an axis through the north and south poles;
      iv) a meridian member extending between the poles;
      v) an indicator slidably mounted on the meridian member for movement in a north/south direction on the sphere;
      vi) a first sensor mounted so as to provide a longitudinal signal representative of the rotary position of the sphere relative to the base;
      vii) a second sensor mounted so as to provide a latitudinal signal representative of the position of the indicator on the meridian;
      viii) a memory operatively connected to the signals from the first and second sensors, the memory storing more detailed map information than is imprinted on the sphere; and
      viii) a display for displaying detailed map information selected from the memory representing the area indicated by the indicator;
   b) moving the indicator and rotating the sphere to select a particular area of interest; and
   c) displaying that area in greater detail on the display.

* * * * *